(12) United States Patent
Tanaka (10) Patent No.: US 8,996,333 B2
(45) Date of Patent: Mar. 31, 2015

(54) INFORMATION PROCESSING APPARATUS WHICH EXECUTES SPECIFIC PROCESSING BASED ON A SPECIFIC CONDITION AND A DETECTED SPECIFIC VIBRATION, AND METHOD FOR CONTROLLING THE SAME

(75) Inventor: Kentaro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 13/341,629

(22) Filed: Dec. 30, 2011

(65) Prior Publication Data

US 2012/0185203 A1  Jul. 19, 2012

(30) Foreign Application Priority Data

Jan. 13, 2011  (JP) ................................ 2011-004506

(51) Int. Cl.
*G06F 15/00* (2006.01)
*G01P 15/00* (2006.01)
*G06F 1/16* (2006.01)
*G06F 3/0487* (2013.01)
*G06F 3/01* (2006.01)
*H04N 101/00* (2006.01)

(52) U.S. Cl.
CPC ............ *G06F 1/1694* (2013.01); *G06F 3/0487* (2013.01); *G06F 3/017* (2013.01); *H04N 2101/00* (2013.01)
USPC .............................. 702/141; 345/173; 702/56

(58) Field of Classification Search
CPC ............ B06B 1/0284; B06B 2201/58; G01N 2291/0258; G01N 29/2412; G01N 29/343; G06F 1/1694; G06F 3/017; G06F 3/0487; H04N 2101/00

USPC ..................... 702/141, 56; 345/173; 324/378; 73/514.29, 579; 701/29.2, 33.9
See application file for complete search history.

(56) References Cited

U.S. PATENT DOCUMENTS

| | | | |
|---|---|---|---|
| 6,072,955 A * | 6/2000 | Yokouchi et al. ................ 396/88 |
| 7,059,182 B1 * | 6/2006 | Ragner ............................ 73/200 |
| 2007/0211573 A1 * | 9/2007 | Hermansson .................... 367/99 |
| 2007/0259685 A1 * | 11/2007 | Engblom et al. ............ 455/550.1 |
| 2009/0031808 A1 * | 2/2009 | Kawahara ........................ 73/510 |
| 2010/0033422 A1 * | 2/2010 | Mucignat et al. ............. 345/156 |
| 2010/0256947 A1 * | 10/2010 | Kim et al. ...................... 702/141 |
| 2011/0187652 A1 * | 8/2011 | Huibers ......................... 345/173 |

FOREIGN PATENT DOCUMENTS

| | | |
|---|---|---|
| JP | 6-004208 A | 1/1994 |
| JP | 2006-139537 A | 6/2006 |
| JP | 2009-127244 A | 6/2009 |
| JP | 2009-302808 A | 12/2009 |

* cited by examiner

*Primary Examiner* — John H Le
(74) *Attorney, Agent, or Firm* — Canon U.S.A., Inc. IP Division (57) ABSTRACT

An information processing apparatus capable of preventing unintentional vibration from being erroneously recognized as vibration caused by a tapping operation is provided. The information processing apparatus detects acceleration caused by vibration applied thereto, determines whether the amplitude of acceleration data detected by the acceleration sensor is greater than or equal to a threshold, analyzes a frequency of the acceleration data when the amplitude is greater than or equal to the threshold, and executes processing assigned to the tapping operation when the frequency analysis result indicates the tapping operation.

10 Claims, 9 Drawing Sheets

INFORMATION PROCESSING APPARATUS WHICH EXECUTES SPECIFIC PROCESSING BASED ON A SPECIFIC CONDITION AND A DETECTED SPECIFIC VIBRATION, AND METHOD FOR CONTROLLING THE SAME

BACKGROUND OF THE INVENTION

1. Field of the Invention

The present invention relates to an information processing apparatus including an input function by an acceleration sensor, a method for controlling the information processing apparatus, a program, and a recording medium.

2. Description of the Related Art

In recent years, information processing apparatuses having a touch panel and an acceleration sensor have been commoditized. The touch panel enables various operations capable of being changed according to the object. A specific instruction can be also input into the information processing apparatus by an operation for moving or vibrating a portable information device itself using the acceleration sensor, or an operation for lightly tapping an outer case (tapping operation).

Japanese Patent Application Laid-Open No. 2009-302808 discusses a digital camera in which a desired function can be set by a user's tapping operation tapping a housing surface of the digital camera with fingertips without operating a physical switch.

Japanese Patent Application Laid-Open No. 06-004208 discusses a portable information apparatus detecting and analyzing movement and rotation applied to a main body of the portable information apparatus using an acceleration sensor, and interprets the movement and the rotation as a specific instruction.

The information processing apparatus preferably responds to a tapping operation of a smaller impact shock in order that everyone can easily utilize the tapping operation. On the other hand, when the information processing apparatus responds to the tapping operation of the small impact shock, the information processing apparatus may respond to impact shocks such as an operation for merely placing the information processing apparatus on a desk, and contact of the information processing apparatus with something in a bag, to cause a so-called false operation.

SUMMARY OF THE INVENTION

Aspects of the present invention include an information processing apparatus that can be operated by applying vibration, and reduce or eliminate a false operation, a method for controlling the information processing apparatus and a recording medium.

According to an aspect of the present invention, an information processing apparatus is configured to cause specific processing to correspond to specific vibration applied to a housing. An information processing apparatus in which a specific process is associated to a specific vibration applied to a housing of the information processing apparatus includes an acceleration sensor configured to detect acceleration caused by the vibration, and a control unit configured to execute the specific processing corresponding to the specific vibration when acceleration data detected by the acceleration sensor does not satisfy a specific condition and the acceleration sensor detects acceleration data showing the specific vibration, and not execute the specific processing corresponding to the specific vibration when the acceleration data detected by the acceleration sensor satisfies the specific condition and the acceleration sensor detects the acceleration data showing the specific vibration.

According to an aspect of the present invention, an information processing apparatus can be operated by applying vibration, thus reducing or eliminating a false operation.

This summary of the invention does not necessarily describe all necessary features so that the invention may also be a sub-combination of these described features.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

An exemplary embodiment to be described below is an example for realizing the present invention. The exemplary embodiment should be suitably changed or modified according to configurations of apparatuses and various conditions to which the present invention is applied. The present invention is not limited to the following exemplary embodiments.

Figure 1:
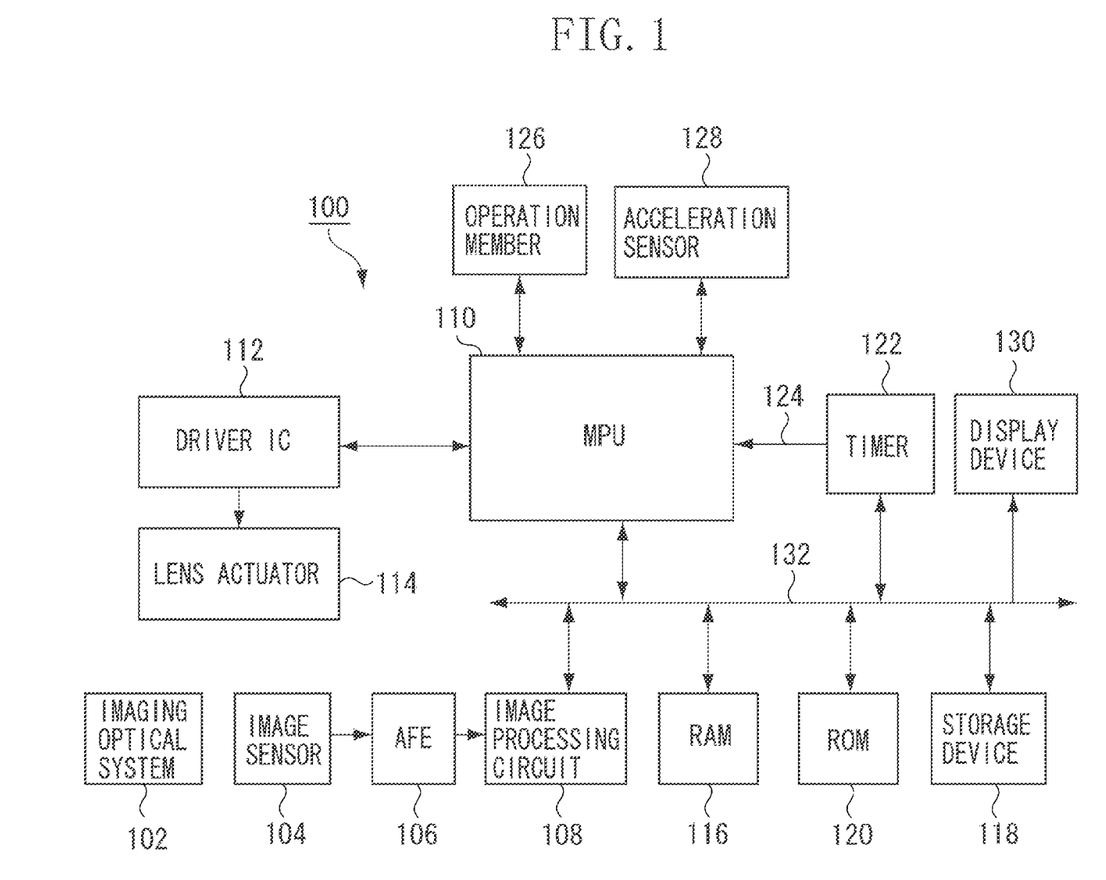
FIG. 1 is a schematic configuration block diagram of an exemplary embodiment of the present invention.

FIG. 1 illustrates a schematic configuration block diagram of a digital camera which is an exemplary embodiment of an information processing apparatus according to the present invention.

An imaging optical system 102 of a digital camera 100 input an optical image of a photogenic subject on an image sensor 104. The image sensor 104 converts an optical image of an imaging area into an electric image signal. An analog front end (AFE) 106 adjusts a level of an analog image signal output from the image sensor 104 to digitize the analog image signal. An image processing circuit 108 subjects the digital image signal output from the AFE 106 to well-known camera signal processing.

An MPU (or CPU) 110 controls focus, zoom, and aperture and the like of the imaging optical system 102 using a driver IC 112 and a lens actuator 114. The MPU 110 temporarily stores image data processed by the image processing circuit 108 in a RAM 116. The MPU 110 stores the image data in a storage device 118 with the image data converted into or compressed to a form suitable for recording.

The storage device 118 includes a hard disk device or a semiconductor memory and the like, and can store captured image data of a certain number or up to a certain time.

The MPU 110 controls the overall digital camera 100. The MPU 110 can perform time division processing to simultaneously process a plurality of tasks. A ROM 120 stores a control program executed by the MPU 110 and a fixed value.

The control program executed by the MPU 110 is loaded in the RAM 116. The RAM 116 also functions as a work area of the MPU 110.

The MPU 110 controls each of units according to an operation state, an output of a timer device 122, an operation of an operation member 126, and a detection output of an acceleration sensor 128. The timer device 122 is a counter for measuring an elapsed time, and generates an interruption 124 to the MPU 110 after the lapse of an arbitrarily set time.

The operation member 126 converts an instruction of an operator's operation into an electric signal, and transmits the electric signal to the MPU 110. The MPU 110 recognizes a user's instruction based on the output of the operation member 126.

The acceleration sensor 128 detects acceleration of an external force applied to a housing of the camera 100 and a direction thereof in three axial directions (X, Y, Z), converts these values into electric signals, and stores the electric signals in an internal register. The MPU 110 reads the values stored in the register of the acceleration sensor 128 to recognize the magnitude and direction of the acceleration applied to the apparatus.

A display device 130 can display a captured subject image in addition to various menus, or can display an image stored in the storage device 118.

The MPU 110 is connected to the image processing circuit 108, the RAM 116, the ROM 120, the storage device 118, the timer device 122, and the display device 130 via a bus 132.

Figure 2:
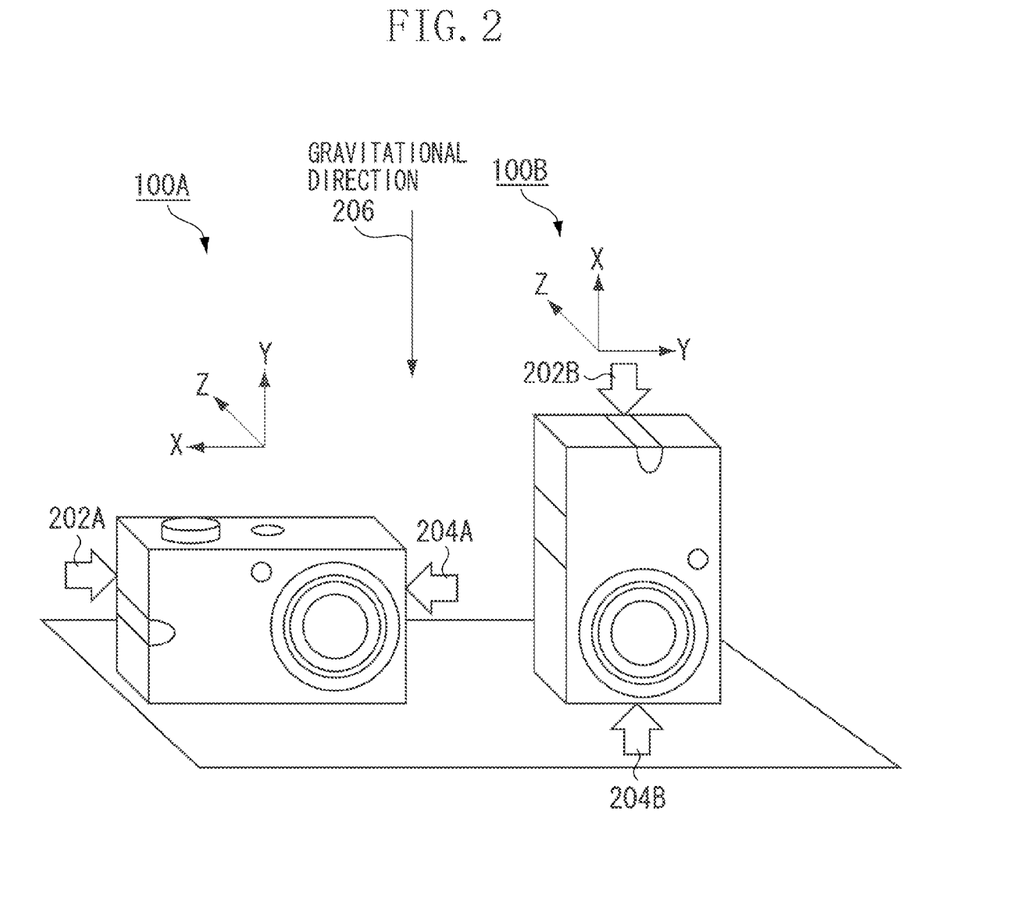
FIG. 2 is a schematic diagram illustrating arrangement examples and coordinate axes for acceleration detection according to an exemplary embodiment.

FIG. 2 is a schematic view illustrating an appearance of the camera 100 and a direction of acceleration when the camera 100 illustrated in FIG. 1 is placed in a horizontal state 100A and in a vertical state 100B.

A horizontal lateral direction, a vertical direction, and a cross direction when the camera 100 is horizontally placed are respectively defined as an X-axis, a Y-axis, and a Z-axis. In the exemplary embodiment, a specific instruction is input into the camera 100 (specifically, the MPU 110) by a tapping operation for tapping lateral side surfaces of the camera 100.

Tapping operations or accelerations thereof 202A and 202B are applied to the right side surface of the camera 100. Tapping operations or accelerations thereof 204A and 204B are applied to the left side surface of the camera 100.

A direction of the camera 100 can be detected by detecting a gravitational direction 206 in which certain acceleration is always applied. The camera 100 may include a gravitational direction detection unit configured to detect the gravitational direction 206. The camera 100 may also discriminate the gravitational direction based on gravitational acceleration (certain acceleration always detected by the acceleration sensor 128) detected by the acceleration sensor 128.

In the horizontal state 100A, a bottom face of the camera 100 is a setting surface. In the vertical state 100B, a left side surface of the camera 100 is a setting surface.

Figure 3:
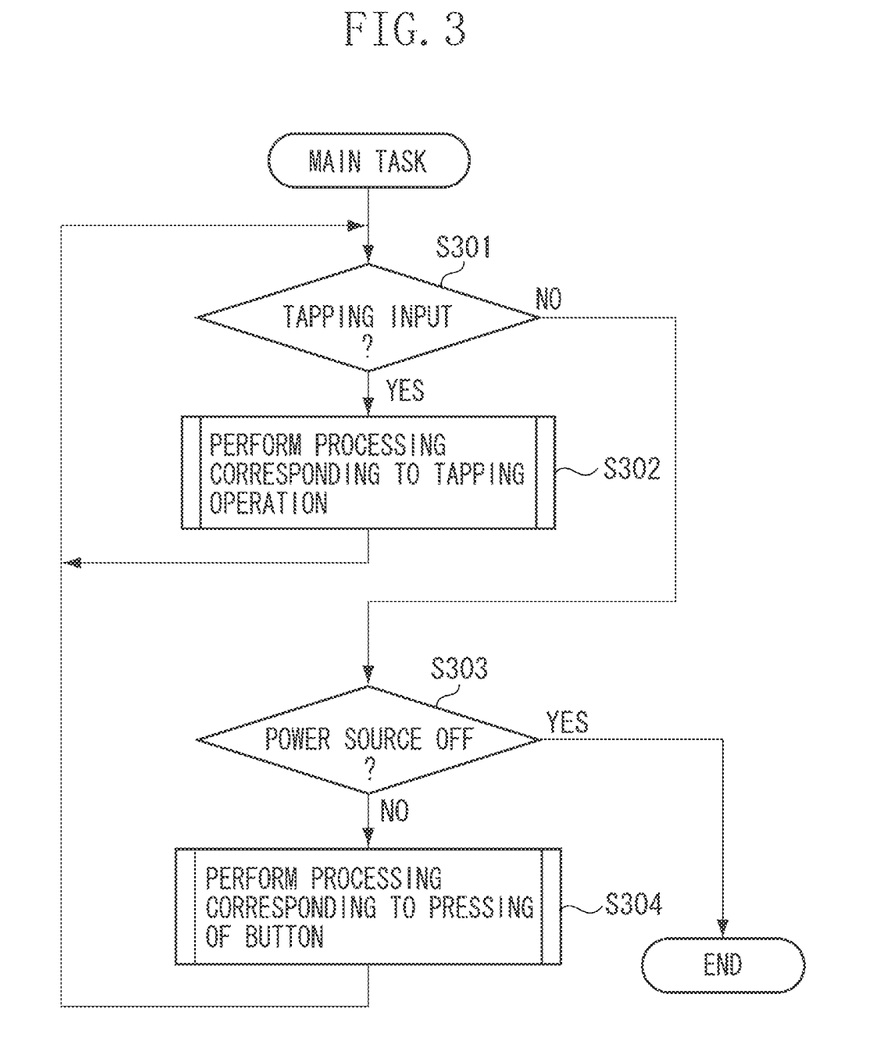
FIG. 3 is a flow chart illustrating a main task according to an exemplary embodiment.
Figure 4:
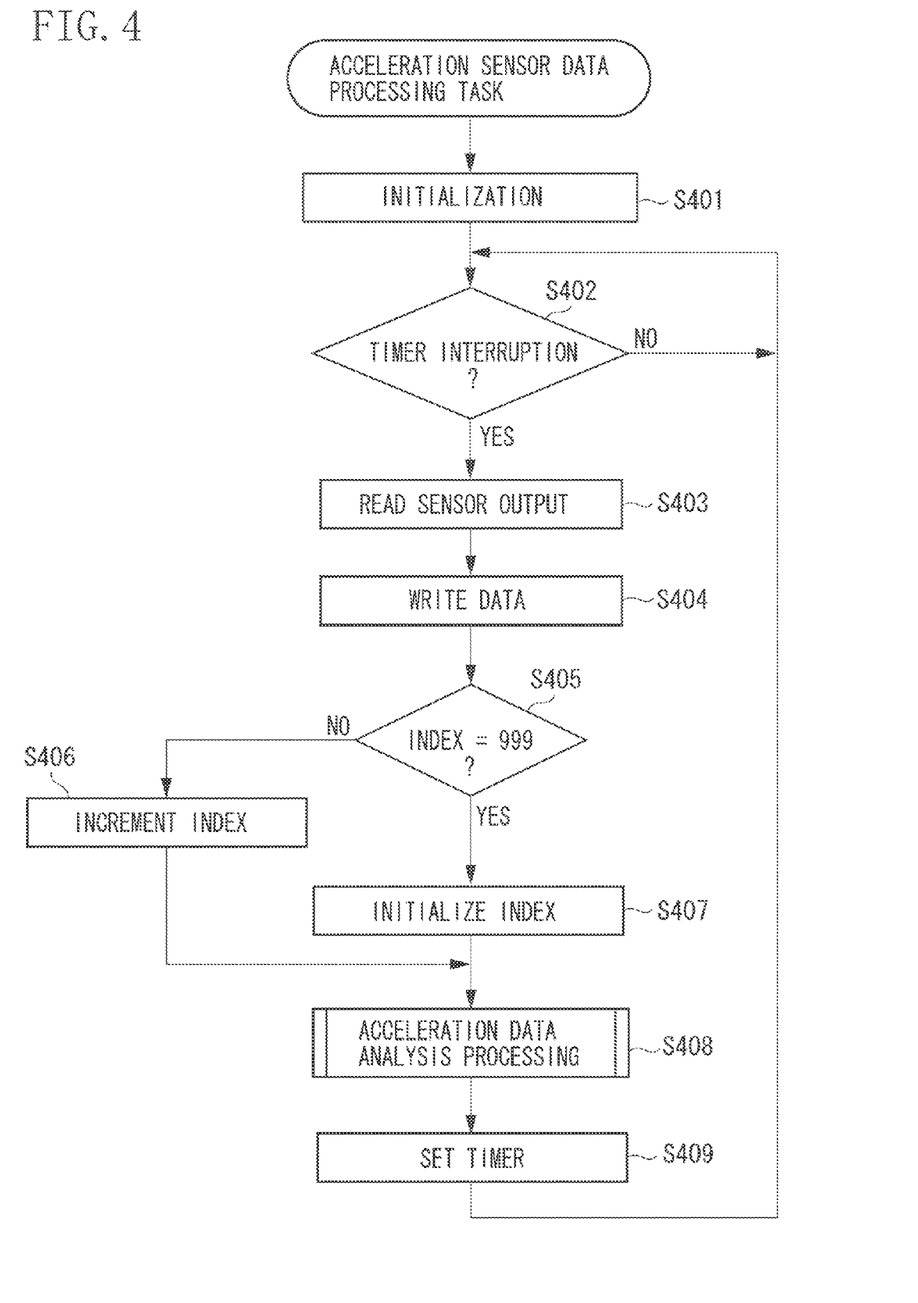
FIG. 4 is a flow chart illustrating an acceleration sensor data processing task according to an exemplary embodiment.

FIG. 3 is a flow chart illustrating a main task operated by the MPU 110. FIG. 4 is a detailed flow chart illustrating a task (acceleration sensor data processing task) of the MPU 110 which processes output of the acceleration sensor 128. The main task illustrated in FIG. 3 and the acceleration sensor data processing task illustrated in FIG. 4 are executed in parallel by time division on the MPU 110.

In the main task, when receiving an input, in step S301, the MPU 110 determines whether the input is operation member input of an operation of the operation member 126 or tapping input of a tapping operation. In the case of the tapping input (YES in step S301), the MPU 110 executes processing previously assigned to the tapping operation in step S302.

On the other hand, in the case of the operation member input (NO in step S301), the MPU 110 ends the main task if a power source is turned off (YES in step S303). If the power source is not turned off (No in step S303), then in step S304, the MPU 110 executes processing corresponding to the operated button and the like.

Figure 5:
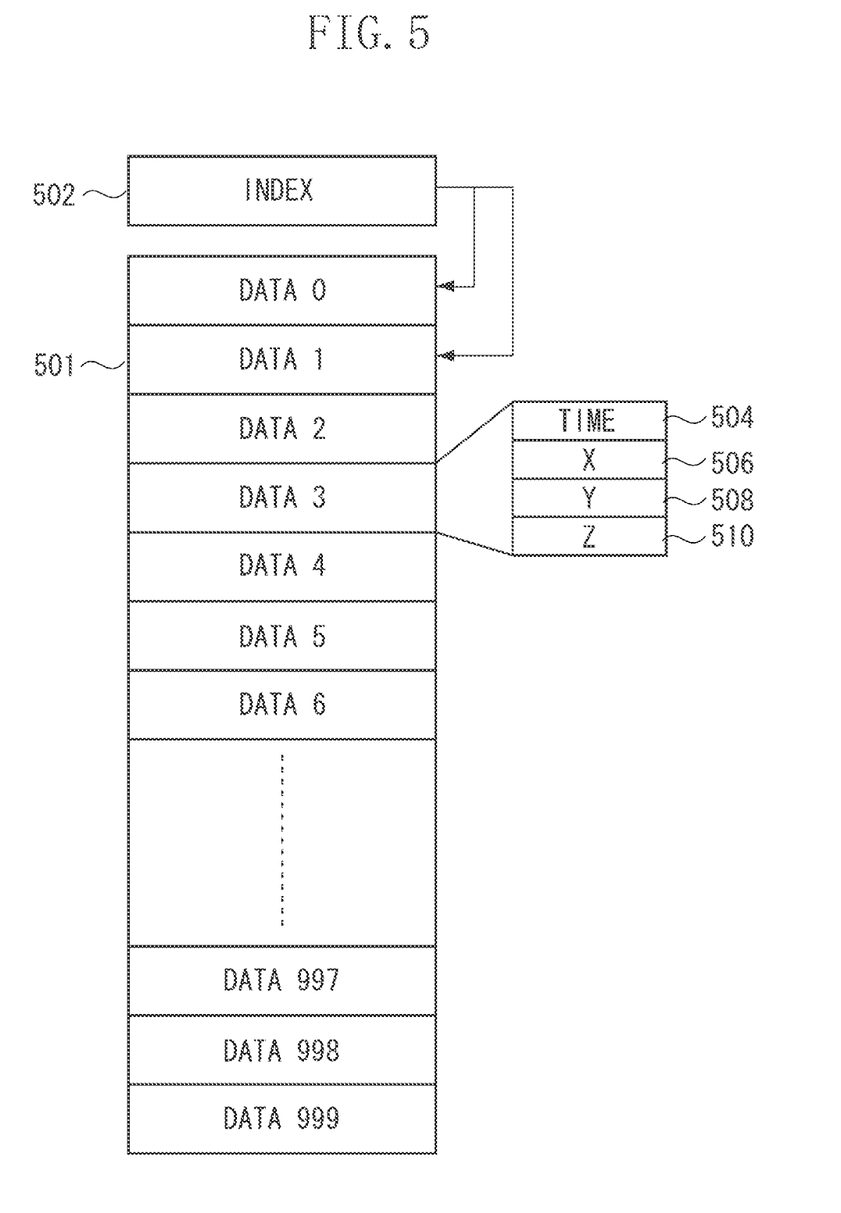
FIG. 5 illustrates a data structure of acceleration sensor output data collected by the acceleration sensor data processing task and stored in a RAM 116.

FIG. 5 illustrates a data structure of acceleration sensor output data collected by the acceleration sensor data processing task and stored in a RAM 116. The data structure includes a data array 501 capable of storing 1000 acceleration data and an index 502 illustrating an address indicating a position in the data array 501 where the next acceleration data is stored. Each piece of acceleration data includes a detection time 504, an X-direction acceleration 506, a Y-direction acceleration 508, and a Z-direction acceleration 510.

Figure 6A:
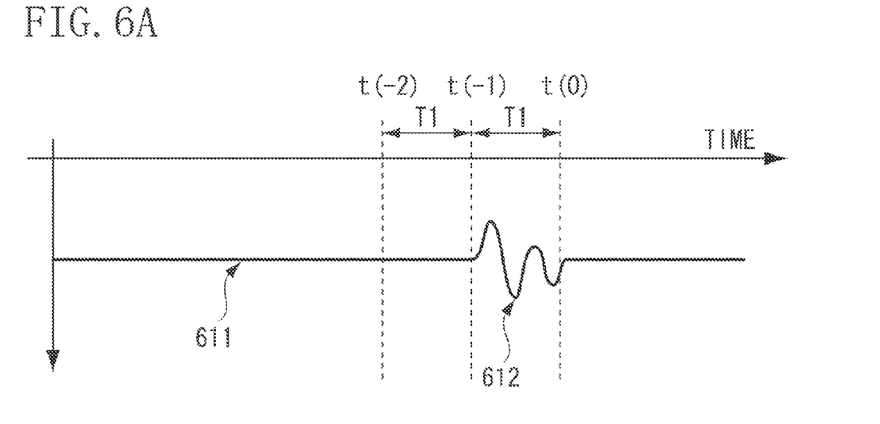
FIGS. 6A, 6B, and 6C are examples of detection waveforms of an acceleration sensor.
Figure 6B:
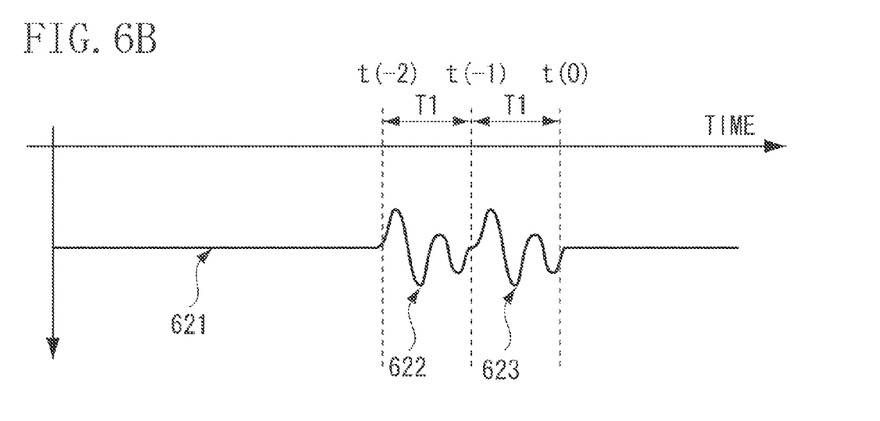
Figure 6C:
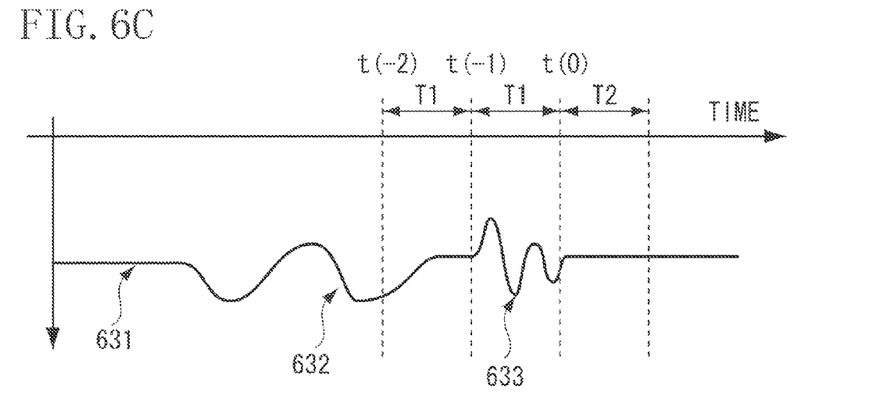

FIGS. 6A, 6B, and 6C are waveform charts each obtained by extracting only one direction of the acceleration data stored in the RAM 116 and developing the one direction on a time axis. A horizontal axis represents a time, and a vertical axis represents a magnitude of acceleration. FIG. 6A illustrates a waveform example for only one-time tap input. A waveform 612 caused by tapping operations 202A or 204A and 202B or 204B is generated respectively after a steady state waveform 611.

FIG. 6B illustrates a waveform example for continuous tap input. Waveforms 622 and 623 caused by two continuous tapping operations 202A or 204A and 202B or 204B are generated respectively after a steady state waveform 621.

FIG. 6C illustrates a waveform example when a waveform change caused by other operation occurs immediately before a tapping operation. A waveform 632 caused by a factor other than the tapping operation is generated after a steady state waveform 631, and a waveform 633 caused by the tapping operation is then generated. The waveform is brought into a steady state after the waveform 633.

Examples of the factors other than the tapping operation include vibration applied to the camera 100 by user's unintentional operations such as an impact shock caused by drop of the camera 100, or contact of the camera 100 with something in a bag, and the like.

With reference to FIGS. 4 and 5, the acceleration sensor data processing task will be described in detail. In step S401, the MPU 110 initializes a resource and a memory and the like utilized in the sensor data processing task at the time of starting the sensor data processing task. This initialization processing includes initialization of the timer device 122, set of interruption (124) of the timer device 122, and initialization of the index 502 on the RAM 116. The index 502 illustrates an initial data storage address of the data array 501.

In step S402, the MPU 110 waits for interruption of the timer device 122. When the interruption is generated (YES in step S402), the MPU 110 reads all acceleration data in logic directions X, Y, Z of the acceleration sensor 128 in step S403. That is, the MPU 110 acquires acceleration data from the acceleration sensor 128 at a predetermined time interval of several msec to several hundred msec.

The MPU 110 writes the read data in a storage area of the RAM 116 illustrated by the index 502 in step S404.

In step S405, the MPU 110 determines whether an address value indicated by the index 502 does not exceed an area of the data array 501 previously secured for collecting acceleration sensor data. When the address value does not exceed the area of the data array 501 (NO in step S405), then in step S406, the MPU 110 increments the index 502. When the address value exceeds the area of the data array 501 (YES in step S405), then in step S407, the MPU 110 initializes the index 502 to indicate a head of the data array 501.

In step S408, the MPU 110 executes acceleration data analysis processing for determining whether the obtained acceleration data corresponds to the tapping operation. This acceleration data analysis processing will be described in detail below referring to FIG. 7. In step S409, the MPU 110 sets the next interruption to the timer device 122, and the processing returns to S402.

Figure 7:
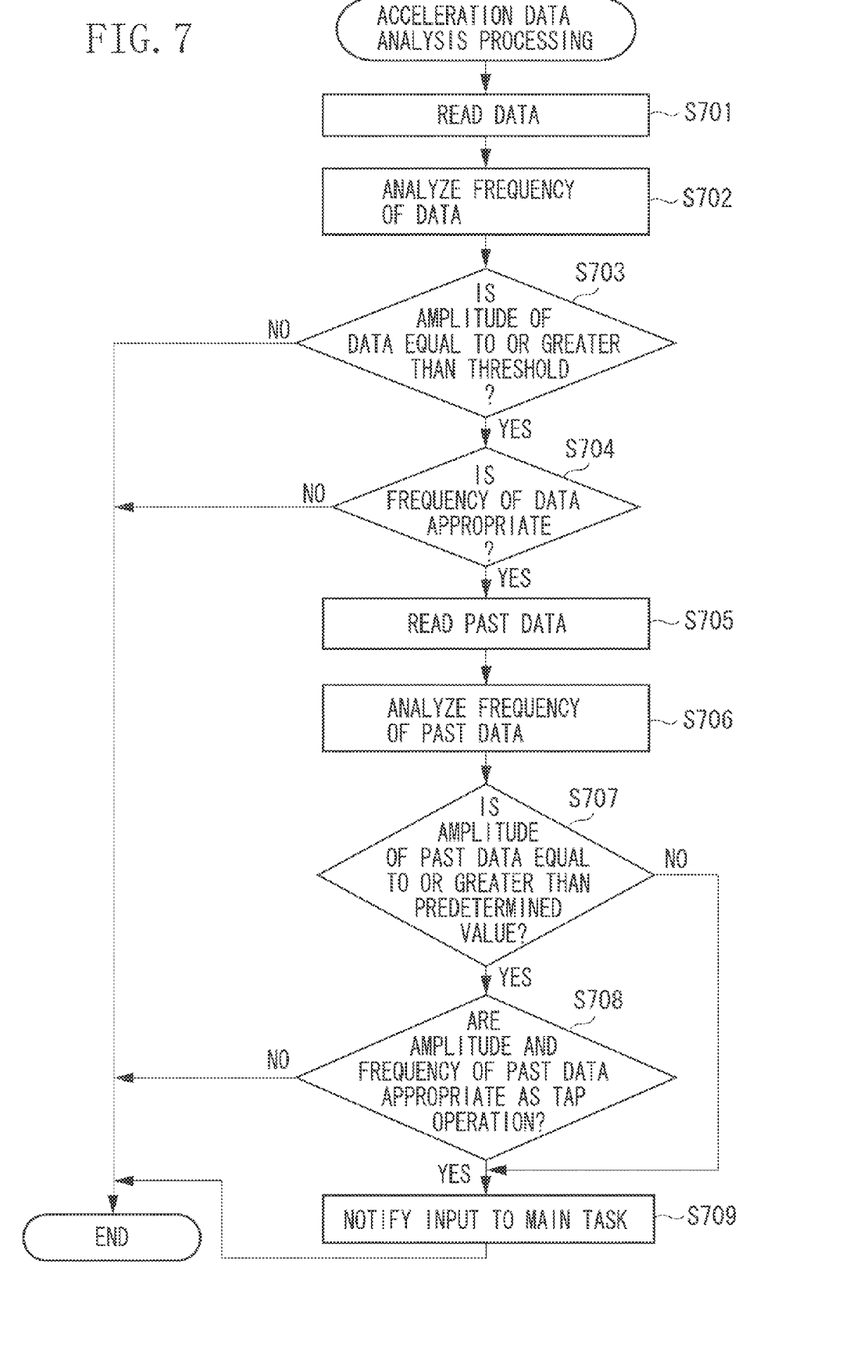
FIG. 7 is a flow chart illustrating acceleration sensor analysis processing according to an exemplary embodiment.

FIG. 7 illustrates a detailed flow chart of the acceleration data analysis processing performed in step S408. In step S701, the MPU 110 reads acceleration data of a certain time T1 of t(−1) to t(0) going back to the past from a storage area illustrated by the index 502 from the RAM 116, and in step S702, analyzes a frequency of the acceleration data. Herein, the acceleration data read from the RAM 116 correspond to the waveforms 612, 623, 633 of FIG. 6.

In step S703, the MPU 110 determines whether the amplitude of the acceleration data within the certain time T1 exceeds a threshold. When the amplitude exceeds the threshold (YES in step S703), in step S704, the MPU 110 further determines whether the frequency is in a predetermined range. When the amplitude does not exceed the threshold (NO in step S703) or the frequency is not appropriate as the tapping operation (NO in step S704), the MPU 110 ends the processing.

A threshold of the amplitude and the range of the frequency, which indicate vibration of the tapping operation, are determined by a result measured by previously performing the tapping operation using a real machine, and are stored in the ROM 120. The user may, as a matter of course, perform the tapping operation before using the real machine, determine the threshold of the amplitude and the frequency range from the measured waveform in this case, and store the threshold and the frequency range in the ROM 120 or the storage device 118.

When the MPU 110 determines that the frequency is in a predetermined range in S704 (that is, when the vibration illustrating the tapping operation is detected) (YES in step S704), then in step S705, the MPU 110 reads acceleration data of a certain time T1 of t(−2) to t(−1) further going back to the past from the RAM 116.

In step S706, the MPU 110 performs frequency analysis of the read past acceleration data. Herein, the acceleration data read from the RAM 116 correspond to a part of the steady state waveform 611, the waveform 622, and a part of the waveform 632 in FIGS. 6A, 6B, and 6C.

In step S707, the MPU 110 determines the amplitude of the read acceleration data. When the amplitude is greater than or equal to a certain value (YES in step S707), then in step S708, the MPU 110 determines whether the amplitude and the frequency are appropriate as the tapping operation.

When the MPU 110 determines that the amplitude and the frequency are not appropriate as the tapping operation (NO in step S708), the MPU 110 ends the processing without executing the processing assigned to the vibration determined in S704. That is, the tapping operation causing the vibration determined in S704 is not notified to the main task.

The threshold and the frequency range when the amplitude is determined may be the same as those when the tapping operation is determined in S703 and S704. Thereby, the continuous tapping operation (FIG. 6B) can be distinguished from the operation other than the continuous tapping operation (FIG. 6C). If it is the continuous tapping operation, processing corresponding to the continuous tapping operation is executed.

On the other hand, if unintentional vibration is generated immediately before, as illustrated in FIG. 6C, the vibration determined to be vibration indicating the tapping operation in the present is also considered to unintentionally occur, and processing corresponding to the tapping operation is not executed. Accordingly, a false operation caused by the unintentional vibration can be suppressed or prevented.

In S707, if the MPU 110 determines that the past data has no amplitude greater than or equal to a certain value (NO in step S707), and, in S708, that the amplitude and the frequency are appropriate as the tapping operation (YES in step S708), then in step S709, the MPU 110 notifies input of the tapping operation to the main task. Various forms such as a message cue, a shared memory, and software interruption can be considered as a method for notifying the input to the main task, and the method can be any of the forms.

The MPU 110 starts processing assigned to the tapping operation when the amplitude of the acceleration data detected by the acceleration sensor 128 is greater than or equal to the threshold and the frequency of the acceleration data shows specific vibration, that is, the tapping operation. The processing is, for example, release of sleep, frame advance of a reproduction image, or a change of a parameter value.

Thus, when the acceleration data showing specific vibration is detected in a state where the acceleration data does not satisfy a specific condition, the MPU 110 performs specific processing corresponding to the specific vibration. On the other hand, the acceleration data showing the specific vibration is detected in a state where the acceleration data satisfies the specific condition, the MPU 110 does not execute the specific processing corresponding to the specific vibration.

In the present exemplary embodiment, the MPU 110 determined whether the acceleration data measured before timer interruption is caused by the specific tapping operation. However, the MPU 110 may determine whether the acceleration data is caused by the specific tapping operation simultaneously with measurement of the acceleration sensor.

The MPU 110 can assign different processes (functions) to operations of a plurality of vibrations, and analyze the acceleration data to determine which operation corresponding to the vibration is performed and to properly perform one of the plurality of processes. In that case, the MPU 110 determines whether the past data includes vibration appropriate as the tapping operation in step S708. However, the MPU 110 may determine whether the past data includes vibration appropriate as any vibration operation.

When the MPU 110 determines that the past data includes the vibration appropriate as any vibration operation (YES in step S708), the MPU 110 considers that an intentional vibration operation is continuously performed, and the processing proceeds to S709.

On the other hand, when the past data includes the vibration inappropriate as any vibration operation, the MPU 110 considers that the apparatus is unintentionally vibrated, and ends the processing without executing the processing corresponding to the vibration operation.

Figure 8:
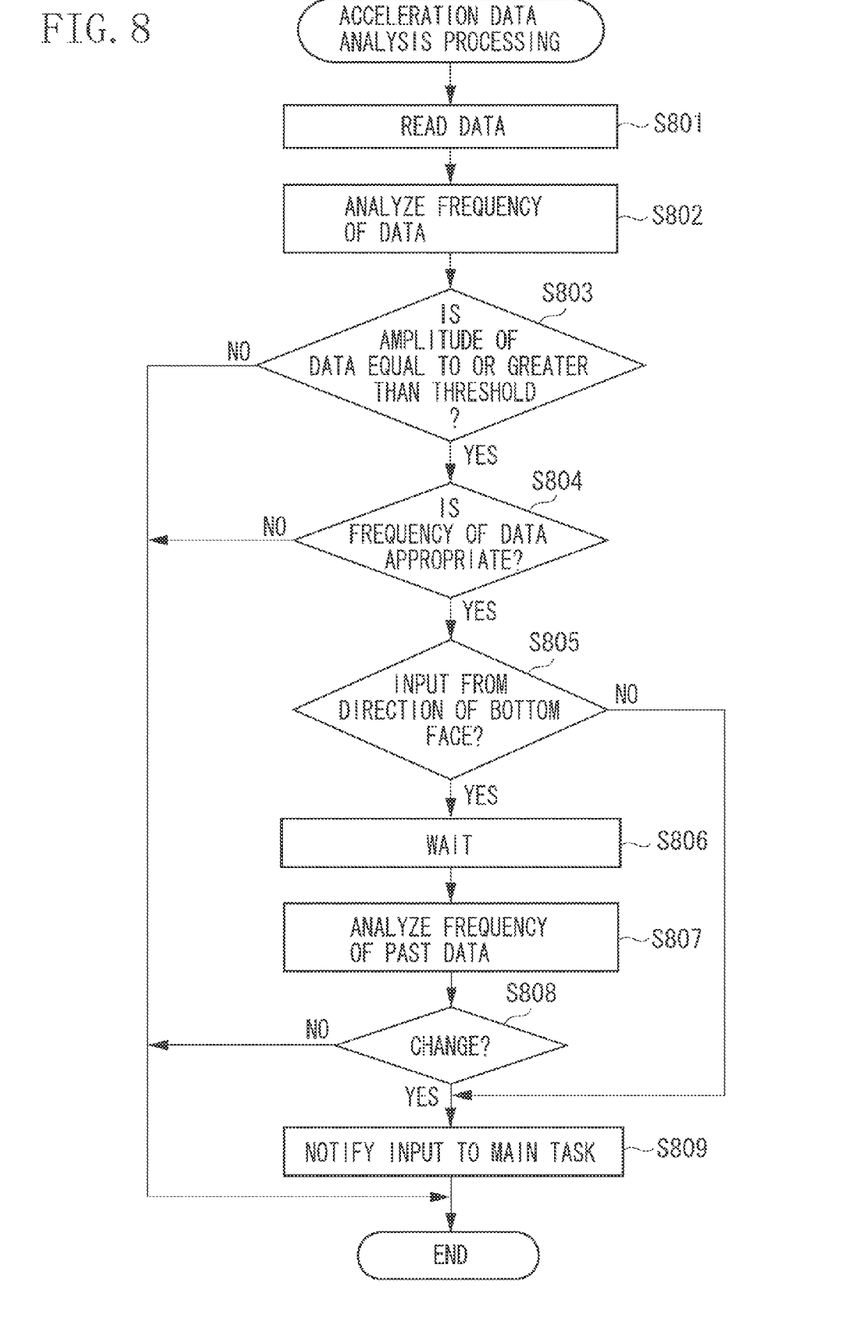
FIG. 8 is another flow chart illustrating the acceleration sensor analysis processing.

FIG. 8 illustrates another flow chart of the acceleration sensor analysis processing performed in step S408. Because processes performed in step S801 to step S804 are similar to those performed in the above-mentioned step S701 to step S704 in FIG. 7, the description thereof is omitted.

When the MPU 110 determines that the frequency is in a predetermined range (that is, when the vibration showing the tapping operation is detected) (YES in step S804), then in step S805, the MPU 110 determines whether the vibration is acceleration of an impact shock from a direction of a bottom face.

The MPU 110 can determine this according to whether the direction of the acceleration of the vibration analyzed in step S802 is parallel to and reverse to a gravitational direction. That is, the MPU 110 can determine that the vibration is input from the bottom face when the gravitational direction 206 coincides with a minus direction of the Y-axis and an acceleration direction is a plus direction of the Y-axis in the case of the horizontal state 100A.

On the other hand, the MPU 110 can determine that the vibration is input from the bottom face when the gravitational direction 206 coincides with a minus direction of the X-axis and the acceleration direction is a plus direction of the X-axis in the case of the vertical state 100B.

When the MPU 110 determines that the vibration is the input from the direction of the bottom face (YES in step S805), then in step S806, the MPU 110 waits for a time T2 of about one cycle of tap input. In step S807, the MPU 110 reads the acceleration data again after the waiting, and in step S808, investigates presence or absence of a data change.

When the vibration determined to be vibration from the bottom face in step S805 by the analysis in step S802 is based on an impact shock when the camera 100 is placed on a desk and the like, the camera 100 is expected to remain still for a while in a state where the camera 100 is placed on the desk and the like.

Therefore, in step S808, when the MPU 110 determines that the acceleration data is not changed (is not vibrated) (NO in step S808), the vibration analyzed in S802 is caused by the impact shock when the camera 100 is placed on the desk and the like, and the vibration is considered not to be a user's intentional tapping operation.

On the other hand, in step S808, when the MPU 110 determines that the acceleration data is changed (is vibrated) (YES in step S808), the camera 100 is considered not to stand still in a state where the camera 100 is placed on the desk and the like. Therefore, although the vibration analyzed in step S802 is from the direction of the bottom face, the vibration is considered not to be caused by vibration when the camera 100 is placed on the desk and the like but to be a user's intentional tapping operation.

Therefore, when the MPU 110 determines that the data is not changed in step S808 (NO in step S808), the MPU 110 ends the processing without executing the processing corresponding to the tapping operation, i.e., without notifying that the tapping operation is performed.

With this processing, the MPU 110 can distinguish the impact shock to the desk and the like from the tapping operation when the camera 100 is placed on the desk and the like.

When the acceleration data is changed before and after the input from the direction of the bottom face (YES in step S808), then in step S809, the MPU 110 notifies the input of the tapping operation to the main task, and ends the processing. Various forms such as a message cue, a shared memory, and software interruption may be considered as a method for notifying the input to the main task, and the method can be any of the forms.

When the acceleration of the impact shock from the reverse side to the gravitational direction is detected, the MPU 110 determines whether the acceleration is a specific tapping operation or not using the acceleration data before and after the detection in the flow chart illustrated in FIG. 8, and ignores or discards acceleration data of a certain time period including the acceleration of the impact shock from the reverse side to the gravitational direction. However, the MPU 110 may simply ignore the acceleration coinciding with the gravitational direction.

Figure 9:
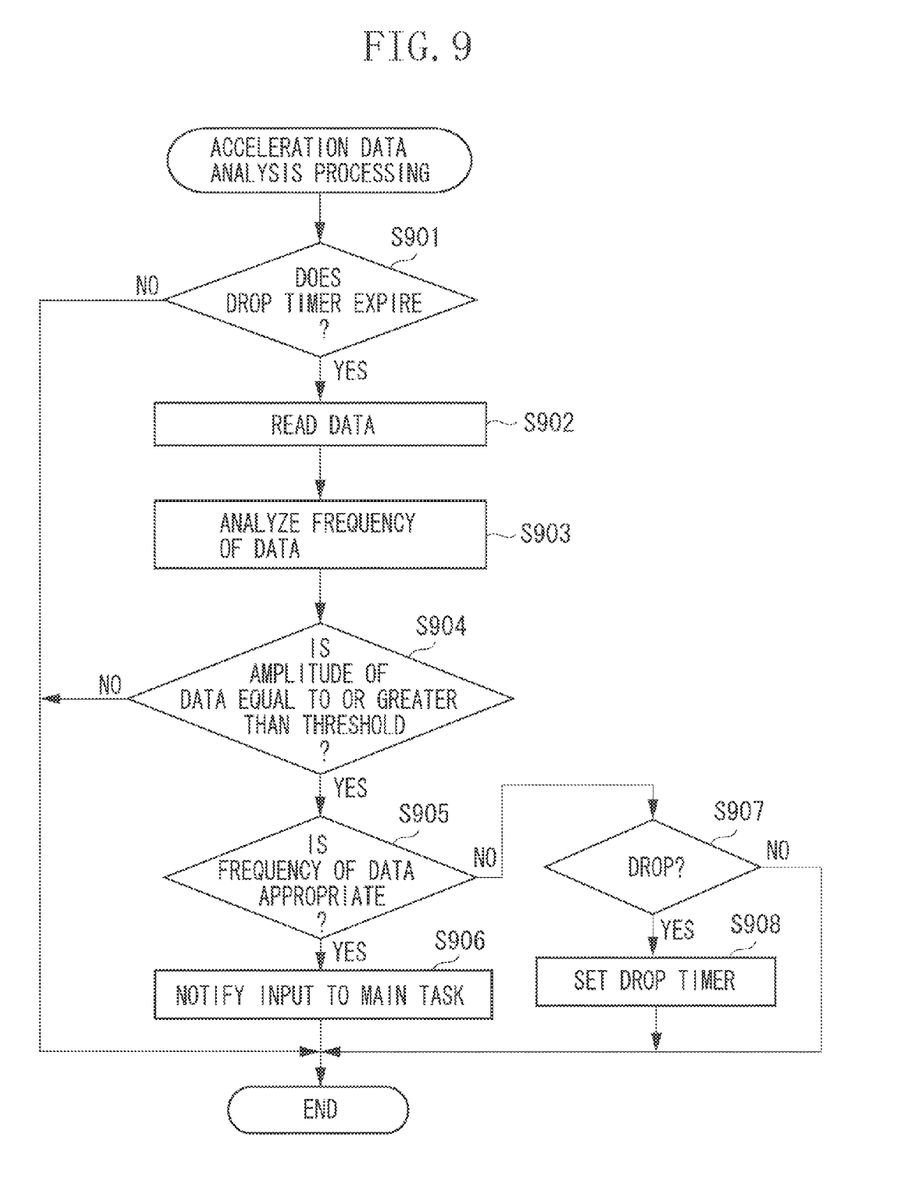
FIG. 9 is still another flow chart illustrating the acceleration sensor analysis processing.

FIG. 9 illustrates another flow chart of the acceleration sensor analysis processing performed in step S408. The processing prevents the drop of the camera 100 from being erroneously recognized as the tapping operation.

In step S901, the MPU 110 investigates whether a drop timer set in the timer device 122 for drop expires or elapses after a specified time. When the drop timer does not expire (NO in step S901), the MPU 110 ends the processing. That is, the acceleration data detected by the acceleration sensor 128 before the drop timer expires is ignored or discarded.

When the drop timer expires (YES in step S901), then in step S902, the MPU 110 reads the acceleration data of the certain time T1 going back to the past from the storage area indicated by the index 502 from the RAM 116, and in step S903, analyzes a frequency of the acceleration data. Herein, the acceleration data read from the RAM 116 correspond to the waveforms 612, 623, 633 illustrated in FIGS. 6A, 6B, and 6C.

In step S904, the MPU 110 determines whether the amplitude of the acceleration data within the certain time T1 exceeds a threshold. When the amplitude exceeds the threshold, then in step S905, the MPU 110 further determines whether a frequency is in a predetermined range.

When the amplitude does not exceed the threshold (NO in step S904), the MPU 110 ends the processing. A threshold of the amplitude and the range of the frequency are determined by a result measured by previously performing the tapping operation using a real machine, and are stored in the ROM 120. The user may, as a matter of course, perform the tapping operation before using, determine the threshold of the amplitude and the frequency range from the measured waveform in this case, and store the threshold and the frequency range in the ROM 120 or the storage device 118.

When the acceleration data shows the frequency appropriate as the tapping operation (YES in step S905), in step S906, the MPU 110 notifies the input of the tapping operation to the main task, and ends the processing. Various forms such as a message cue, a shared memory, and software interruption may be considered as a method for notifying the input to the main task, and the method can be any of the forms.

When the acceleration data does not show the frequency appropriate as the tapping operation (NO in step S905), then in step S907, the MPU 110 determines whether the acceleration data shows drop according to a frequency analysis result. When the MPU 110 determines that the acceleration data shows the drop (YES in step S907), then in step S908, the MPU 110 sets a predetermined value to the drop timer, starts the drop timer, and ends the processing. In step S907, when the acceleration data does not show the drop (NO in step S907), the MPU 110 ends the processing.

Since the acceleration data is not acquired during the drop or for a certain time period immediately after the drop (a period until the drop timer expires since the acceleration data is not determined as the drop) according to the present exemplary embodiment, the processing corresponding to the tapping operation is not executed even if the vibration is appropriate as the tapping operation. Accordingly, erroneous detection of the vibration caused by the drop as the tapping operation can be suppressed or prevented.

As described above, in each of the exemplary embodiments, control by the MPU 110 may be executed by one unit of hardware, or a plurality of units of hardware may share the processes to control the overall apparatus.

The exemplary embodiments of the present invention have been described above. However, the present invention is not limited to those specific exemplary embodiments, and includes various forms without departing from the spirit of the invention. Furthermore, the above-mentioned exemplary embodiments are used for description, and can be also suitably combined.

The exemplary embodiments in which the present invention has been applied to the imaging apparatus have been described. However, the present invention is not limited to the imaging apparatus. The example of the tapping operation has been described as the operation of the vibration. However, the present invention is not limited thereto.

Insofar as the application of the vibration to a main body of the apparatus by tapping, shaking, and inclining the main body of the apparatus is utilized as operation input, the present invention can be applied. More specifically, the present invention can be applied to a personal computer, a PDA, a mobile telephone terminal, a portable image viewer, a digital photo frame, a music player, a game machine, and an electronic book reader, and the like.

The game machine includes a portable game machine and a remote controller of a stationary game machine and the like. The present invention can be applied to a stationary device using operations such as tapping, shaking, inclining, and the like of parts of the stationary device as operation input. However, the operations such as tapping, shaking, inclining, and the like of the main body of the portable device are easily applied to the portable device.

The present invention is also realized by executing the following processing. That is, software (program) realizing the functions of the above-mentioned exemplary embodiments is supplied via a network or various storage media to a system or a device, and CPU, MPU, or the like of the system or the device reads and executes a program code. In this case, the present invention includes the program and a recording medium recording the program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-004506 filed Jan. 13, 2011, which is hereby incorporated by reference herein in its entirety.

What is claimed is:

1. An information processing apparatus in which a specific process is associated to a specific vibration applied to a housing of the information processing apparatus, the information processing apparatus comprising:
an acceleration sensor configured to detect acceleration caused by vibration and provide acceleration data which represents the vibration; and
a control unit configured to execute the specific processing corresponding to the specific vibration when acceleration data provided by the acceleration sensor does not satisfy a specific condition and the acceleration sensor provides acceleration data showing the specific vibration, and not execute the specific processing corresponding to the specific vibration when the acceleration data provided by the acceleration sensor satisfies the specific condition and the acceleration sensor provides the acceleration data showing the specific vibration.

2. The information processing apparatus according to claim 1, wherein the specific condition is that the acceleration data shows other vibration, which is not the specific vibration, immediately before the acceleration sensor detects the acceleration having the specific vibration.

3. The information processing apparatus according to claim 1, wherein the specific condition is that the acceleration data shows vibration that does not correspond to the specific processing immediately before the acceleration sensor detects the acceleration having the specific vibration.

4. The information processing apparatus according to claim 1, wherein the specific condition is that the acceleration data showing the specific vibration is determined to indicate vibration caused by an impact shock applied from a side of the information processing apparatus opposite to a gravitational direction, and it is determined that the information processing apparatus stands still for a subsequent predetermined time.

5. The information processing apparatus according to claim 1, wherein the specific condition is that the acceleration data showing the specific vibration is determined to indicate vibration caused by an impact shock applied from a side of the information processing apparatus opposite to a gravitational direction.

6. The information processing apparatus according to claim 1, wherein the specific condition is that acceleration data indicating drop is provided by the acceleration sensor.

7. The information processing apparatus according to claim 1, wherein the information processing apparatus is a portable information processing apparatus.

8. The information processing apparatus according to claim 1, wherein the information processing apparatus is an imaging apparatus including an imaging unit.

9. A method for controlling an information processing apparatus configured to detect vibration applied to a housing thereof using an acceleration sensor, and to execute a specific process for a specific vibration, the method using an acceleration sensor configured to detect acceleration caused by vibration and provide acceleration data which represents the vibration, the method comprising:

determining whether the acceleration data provided by the acceleration sensor satisfies a specific condition; and executing the specific processing corresponding to the specific vibration when acceleration data provided by the acceleration sensor does not satisfy the specific condition and the acceleration sensor provides acceleration data showing the specific vibration, and not executing the specific processing corresponding to the specific vibration when the acceleration data provided by the acceleration sensor satisfies the specific condition and the acceleration sensor provides the acceleration data showing the specific vibration.

10. A non-transitory computer-readable storage medium configured to store a program causing a computer to execute the method of claim 9.

* * * * *